United States Patent [19]

Coran et al.

[11] 4,358,553

[45] Nov. 9, 1982

[54] COMPOSITIONS OF NITRILE RUBBER AND CELLULOSE ESTER

[75] Inventors: Aubert Y. Coran; Raman Patel, both of Akron, Ohio

[73] Assignee: Monsanto Company, St. Louis, Mo.

[21] Appl. No.: 265,302

[22] Filed: May 20, 1981

[51] Int. Cl.$^3$ ............................ C08L 1/10; C08L 1/14
[52] U.S. Cl. ...................................... 524/37; 523/202; 523/206; 523/334; 524/38
[58] Field of Search .................. 260/13, 17 R, 17.4 R, 260/17.4 BB, 17.4 CL, 27 R, 23.7 N; 523/202, 206, 334; 524/37, 38

[56] References Cited

U.S. PATENT DOCUMENTS 4,104,210  8/1978  Coran et al. ...................... 260/4 R
4,141,863  2/1979  Coran et al. ...................... 260/3
4,243,769  1/1981  Pritchett .......................... 260/17 R

OTHER PUBLICATIONS

Encyclopedia of Polymer Science and Technology, "Polyblends," vol. 10, pp. 694–709.

Primary Examiner—John Kight, III
Assistant Examiner—Nathan M. Nutter
Attorney, Agent, or Firm—Larry R. Swaney

[57] ABSTRACT

Compositions are described comprising blends of nitrile rubber and cellulose ester.

15 Claims, No Drawings

COMPOSITIONS OF NITRILE RUBBER AND CELLULOSE ESTER

This invention relates to polymer blend compositions and, more particularly, to thermoplastic compositions comprising blends of cellulose ester and cured nitrile rubber.

BACKGROUND OF THE INVENTION

Thermoplastics are compositions which can be molded or otherwise shaped and reprocessed at temperatures above their melting or softening points. Thermoplastic elastomers (elastoplastics) are materials which exhibit both thermoplastic and elastomeric properties, i.e., the materials process as thermoplastics but have physical properties like elastomers. Shaped articles may be formed from thermoplastic elastomers by extrusion, injection molding or compression molding without the time-consuming step required with conventional vulcanizates. Elimination of the time required to effect vulcanization provides significant manufacturing advantages. Further, thermoplastic elastomers can be reprocessed without the need for reclaiming, and, in addition, many thermoplastics can be thermally welded.

Moldable elastoplastic compositions of plastic resins and cured high unsaturation diene rubbers containing high proportions of rubber are known (A. Y. Coran and R. Patel, U.S. Pat. Nos. 4,104,210 and 4,141,863).

SUMMARY OF THE INVENTION

It has been discovered that compositions comprising blends of (a) thermoplastic cellulose ester selected from the group consisting of cellulose propionate, cellulose butyrate, and cellulose acetate mixed esters thereof, and (b) cured nitrile rubber exhibit a valuable combination of properties. Generally, compositions comprising about 5-65 parts by weight of cellulose ester and, correspondingly, 95-35 parts by weight of cured nitrile rubber are moldable thermoplastic compositions exhibiting improved strength, greater toughness or impact resistance, or improve true stress at break. A preferred composition comprises a blend of about 10-40 parts by weight of cellulose ester, and correspondingly, about 90-60 parts by weight of cured nitrile rubber. Cross-linking the rubber increases the tensile strength and improves toughness of the composition. In addition, cross-linking the rubber improves the high temperature properties of the blend and, in the case of nitrile rubber containing low acrylonitrile content, improves the solvent resistance. The properties of the composition improve as the extent of cross-linking of the rubber increases. In preferred compositions, the nitrile rubber is cured to the extent that no more than 25 weight percent, preferably no more than 10 weight percent of the rubber is extractable in a solvent in which uncured nitrile rubber is essentially completely soluble. Compositions comprising 35 or more parts by weight of cellulose ester per 100 parts by weight of both the cellulose ester and cured nitrile rubber combined are thermoplastic compositions exhibiting improved impact resistance. Generally, compositions comprising 65 or more parts by weight of cured nitrile rubber per 100 parts by weight of rubber and cellulose ester are elastomeric. When compositions containing high proportions of rubber are statically cured, such as in molds, thermoset compositions are obtained; whereas, if such compositions are dynamically cured, i.e., if the blend is masticated while the rubber is cured, elastoplastic compositions are obtained which compositions exhibit elastomeric properties, and yet are processable as thermoplastics.

The relative proportions of cellulose ester and cured nitrile rubber of the elastoplastic compositions of the invention are not subject to absolute delineation because the limits vary, due to a number of factors including type, molecular weight, or molecular weight distribution of the cellulose ester or rubber, the type of nitrile rubber, and type and amount of curative used to cure the rubber. The amount of cellulose ester must be sufficient to impart thermoplasticity to the compositions, and the amount of cured nitrile rubber must be sufficient to impart rubberlike elasticity to the composition. The term "rubberlike elasticity" means for the composition to have a tension set value of about 50% or less. The range of proportions for which the composition is elastoplastic may be ascertained in a few simple experiments by those skilled in the art by following the teachings herein. Generally, elastoplastic compositions of the invention comprise blends of about 5-35 parts by weight of cellulose ester and, correspondingly, about 95-65 parts by weight of cured nitrile rubber per 100 total parts by weight of cellulose ester and rubber. Blends containing lesser proportions of cellulose ester generally exhibit better tension set, whereas, blends containing higher proportions of cellulose ester exhibit higher stress-strain properties. including true stress at break, TSB.

It is important for thermoplasticity that the cured rubber is present in the form of small dispersed particles, otherwise, the composition will either be weak or not processable as a thermoplastic. If the rubber is not dispersed and forms a somewhat continuous phase throughout the blend, a thermoset composition not processable as a thermoplastic may be obtained. The dispersed rubber particles must be small enough to maintain strength and thermoplasticity of the composition. If the particles are too large, weak, low strength blends are obtained. Compositions containing still larger particles may not be processable as thermoplastics. Accordingly, it is understood that in thermoplastic compositions of the invention, the particle size is small enough to maintain both high strength and thermoplasticity. Generally, the cured rubber particles are of a size of about 50 microns number average or less. The smaller the particle size, the better the properties, including strength and processability. Preferably, the particle size is about 10 microns number average or less. The dynamic curing process, when carried out properly, can give cured rubber particles within the range of about 0.1 to 2 microns number average.

In order to achieve the improved thermoplastic compositions of the invention, it is essential that the rubber is cured with enough rubber curative so that the rubber is cured sufficiently to give a composition having a substantially greater tensile strength than a corresponding blend containing uncured rubber. Preferably sufficient rubber curative is used to also give a 25 percent or greater increase in tensile strength. In preferred thermoplastic compositions, the extent of cure of the rubber is such that the tensile strength is at least two times the tensile strength of the similar blend in which the rubber is uncured.

Elastoplastic compositions of the invention are preferably prepared by a dynamic curing process which comprises masticating a mixture of melted cellulose ester, nitrile rubber, and curative at a curing temperature until curing is complete. Conventional rubber masticating equipment, for example, Banbury Mixers, Brabender Mixers, and mixing extruders, may be used to carry out the dynamic vulcanization process. The cellulose ester and nitrile rubber typically are mixed at a temperature above the cellulose ester flow temperature, after which curative is added. Mastication at vulcanization temperature is continued until vulcanization is complete, generally within a few minutes, depending on the temperature. To obtain thermoplastic elastomeric compositions, it is desirable that mixing continues without interruption until vulcanization is complete. If appreciable curing is allowed after mixing has stopped, a thermoset unprocessable composition may be obtained. Frequently, the cured blend is removed from the mixer and cooled, then returned and masticated again above the flow temperature of the cellulose ester.

The additional mastication step may generally improve the processability of the composition, especially when higher proportions of rubber are used. For further details concerning dynamic vulcanization and determination of the extent of cure of the rubber, refer to the Coran et al patents, supra.

The particular results obtained by the aforesaid dynamic curing process are a function of the particular rubber curing system selected. Preferably, enough curative is used to cross-link the rubber to the extent that the cross-link density of the rubber is in the order of about $3 \times 10^{-3}$ to $3 \times 10^{-4}$ moles per milliliter of rubber. Of course, the cross-link density should not be too high lest the properties of the composition be impaired.

One embodiment of the invention consists of a thermoset composition comprising a blend of cellulose ester and cured nitrile rubber which is in the form of a continuous network rather than being in particulate form. Thermoset compositions of the invention are prepared by first blending cellulose ester and nitrile rubber at a temperature sufficient to melt the cellulose ester by using conventional masticating equipment. The composition is then worked on a rubber mill where curatives are incorporated therein at a temperature below the activation temperature of the curative system. The temperature can also be below the melting or softening temperature of the cellulose ester, in which case the cellulose ester would be a dispersed phase especially after mill working. The curable composition is then sheeted by passage through a roll mill or a shaped specimen is otherwise prepared. The sheet or shaped specimen is then cured by conventional means, typically be heating under pressure. The specimens may be cured either above or below the melting point of the cellulose ester. When a specimen is cured below the melting point of the ester, the physical properties of the cured specimen can be dependent upon the direction of the measurement because of orientation of cellulose ester particles. The degree of anisotropy of any particular specimen depends upon the proportion of cellulose ester in the blend and the degree of orientation. Orientation of the cellulose ester particles can be conveniently achieved by passing a sheeted material one or more times through the rolls of an even speed mill.

Methods other than dynamic vulcanization can be utilized to prepare elastoplastic compositions of the invention. For example, nitrile rubber can be fully vulcanized in the absence of the cellulose ester, comminuted, and mixed with molten cellulose ester. Provided that the cured rubber particles are small, well dispersed and in an appropriate concentration, thermoplastic compositions within the invention are obtained by blending cured nitrile rubber and cellulose ester. In addition, provided that enough cellulose ester is present, thermoplastic compositions may be prepared by masticating blends of cellulose ester and nitrile rubber, incorporating curatives and then curing under static conditions, such as, in a mold.

Thermoplastic compositions of the invention are all processable in an internal mixer, to give products which, upon transferring at temperatures above the flow temperature of the cellulose ester to the rotating rolls of a rubber mill, form continuous sheets. The sheets are reprocessable in the internal mixer, after reaching temperatures above the softening or melting point of the cellulose ester. The material is again transformed to the plastic state but upon passing the molten product through the rolls of the rubber mill a continuous sheet again forms. In addition, a sheet of thermoplastic composition of this invention can be cut into pieces and compression molded to give a single smooth sheet with complete knitting or fusion between the pieces. It is in the foregoing sense that "thermoplastic" will be herein understood. In addition, thermoplastic compositions of the invention are further processable to the extent that articles may be formed therefrom by extrusion, injection molding, or calendering.

Rubbers satisfactory for the practice of the invention comprise essentially random noncrystalline, rubbery copolymers of 1,3-butadiene or isoprene copolymerized with vinyl nitrile monomer, such as acrylonitrile or methacrylonitrile which rubber copolymers are commonly called and are referred to herein and in the claims as nitrile rubber. Commercially available nitrile rubbers suitable for the practice of the invention are described in *Rubber World Blue Book*, 1975 Edition, Materials and Compounding Ingredients for Rubber, pages 416–430. Copolymers of about 85–40% diene and about 15–60% acrylonitrile are suitable with copolymers containing 30–55 weight percent acrylonitrile being preferred. Nitrile rubbers containing higher proportions of acrylonitrile (AN) gives stronger blend compositions, probably due to better compatibility with the cellulose ester. Also, the high AN nitrile rubber blends exhibit superior solvent resistance. The gel (solvent insoluble) content of certain nitrile rubbers, may be increased by masticating the rubber at elevated temperature for a time sufficient to achieve a toluene insoluble gel content of at least 80% or more. Typically, the rubber is masticated, either alone but preferably with cellulose ester, at 120°–250° C., preferably, 150°–220° C., for times of 1–100 minutes. The time required is shorter at higher masticating temperatures. Mastication in the presence of air may also shorten the time necessary to achieve high gel contents. Other nitrile rubbers, especially highly stabilized grades, cannot be practically gelled by high temperature mastication. These rubbers should be cured with rubber curatives in order to achieve the toluene insoluble gel content in accordance to this invention.

The particular results obtained by the afore-described dynamic curing process are a function of the particular rubber curing system selected. Curatives and the curative systems conventionally used to vulcanize nitrile rubbers are used for preparing compositions of the invention. For example, peroxide, azide, acrylate, bismaleimide, phenolic resin, and sulfur-vulcanizing systems may be used in preparing compositions of the invention. The selection of any particular vulcanizing systems varies depending upon the nature of the cellulose ester and the nitrile rubber. High energy radiation is also utilizable as a curative means.

The amount of curative varies, depending upon the type of curative and the composition of the blend. Enough curative must be used to cross-link the rubber while excessive quantities of curatives, beyond the amount necessary to fully cure the rubber should be avoided, lest properties of the compositions be diminished.

Suitable thermoplastic cellulose esters are cellulose propionate, cellulose butyrate, cellulose acetate propionate and cellulose acetate butyrate. Cellulose esters are prepared by reaction of cellulose with one or more acids, anhydrides, or acid chlorides by known methods. For details of preparation and of properties of various cellulose esters, refer to *Encyclopedia of Polymer Science and Technology*, Vol. 3, pages 325–354. Cellulose esters are readily available commercial products. In cellulose acetate mixed esters, the amount of acetyl groups should be less than the other ester group present. Cellulose acetate esters and cellulose esters containing high proportions of acetyl groups are unsatisfactory and result in low strength compositions.

To obtain softer compositions and to enhance processability of the blends of the invention, it is sometimes desirable to add plasticizers. Examples of suitable cellulose ester plasticizers are shown in Table 5, page 348 of the *Encyclopedia of Polymer Science and Technology*. Preferred plasticizers for nitrile rubber are sulfonamide-type plasticizers.

The properties of the compositions of the invention may be modified by the addition of ingredients which are conventional in the compounding of nitrile rubber and cellulose ester. Examples of such ingredients include carbon black, silica, titanium dioxide or other pigments, clay, silanes, titanates or other coupling agents, stabilizers, antidegradants, plasticizers, processing aids, adhesives, tackifiers, wax, and discontinuous fibers such as wood cellulose or glass fibers, etc. The addition of particulate filler, preferably prior to dynamic vulcanization, is particularly recommended. Preferably, the particulate filler is masterbatched with the nitrile rubber and the masterbatch is then mixed with the cellulose ester. Typical additions of particulate fillers or reinforcement fillers such as carbon black comprise about 20–150 parts by weight of filler per 100 parts by weight of rubber. The amount of particulate filler which can be used depends, at least in part, upon the type of filler and the presence of other ingredients such as plasticizer.

Thermoplastic compositions of the invention are useful for making a variety of articles such as tires, hoses, belts, gaskets, moldings, and molded parts. They are particularly useful for making articles by extrusion, injection molding and compression molding techniques. Compositions of the invention also are useful for blending with other thermoplastics, in particular, nylons and various cellulose esters. Compositions of the invention are blended with thermoplastics by using conventional mixing equipment. The properties of the blend depend upon the proportions. Generally, the amount is such that the blend contains sufficient proportion of each component to obtain the desired effect.

Tensile properties of the compositions are determined by ASTM procedure D-638. Specimens are pulled with a tensile tester at one inch per minute up to 30% elongation and then 10 inches per minute to failure. The term "elastomeric" as used herein and in the claims applies to a composition which possesses the property of forcibly retracting within ten minutes to less than 160% of its original length after being stretched at room temperature to twice its unstressed length and held for ten minutes before release. True stress at break (TSB) is the tensile strength at break multiplied by the extension ratio also at break, extension ratio being the length of a tensile test specimen at break divided by the original, unstressed length of the test specimen. Alternately, extension ratio is 1.00 plus 1/100 of the percent ultimate elongation. Especially preferred compositions of the invention are rubbery compositions having tension set values of about 50% or less. More preferred compositions have a Shore D hardness of 50 or below or a TSB between 30–100 MPa (megapascals) or a Young's modulus below about 100 MPa.

DESCRIPTION OF THE PREFERRED EMBODIMENTS

Compositions illustrating the invention are prepared by charging cellulose ester and nitrile rubber, in the indicated amounts (all parts by weight) to a Brabender mixer at 180° C. The compositions are mixed (at about 80 rpm) until the cellulose ester melts and a blend is formed; rubber curatives, if used, are then added and mixing is continued until a maximum consistency is reached. The compositions are then removed from the mixer, cooled, returned to the mixer and mixed for 2–2½ additional minutes. Test specimens are prepared by compression molding at 210° C. Compositions without rubber curatives are prepared in a similar manner. The properties of blends in which the nitrile rubber is cross-linked are shown in parentheses.

TABLE 1

|  | 1 | 2 | 3 | 4 | 5 | 6 | 7 |
|---|---|---|---|---|---|---|---|
| Nitrile Rubber | 90 | 80 | 70 | 60 | 50 | 40 | 30 |
| Cellulose Acetate Propionate | 10 | 20 | 30 | 40 | 50 | 60 | 70 |
| SP-1056* | 4.5 | 4 | 3.5 | 3 | 2.5 | 4 | 3 |
| Zinc Stearate* | 0.45 | 0.4 | 0.35 | 0.3 | 0.5 | 0.4 | 0.3 |
| Properties |  |  |  |  |  |  |  |
| UTS, MPa | 0.9 | 1.4 | 2.6 | 4.2 | 11.2 | 17.5 | 33.9 |
|  | (8.9) | (14.9) | (18.5) | (19.4) | (20.2) | (21.5) | (23.3) |
| $M_{100}$, MPa | 1.0 | 1.5 | 2.7 | 2.7 | — | — | — |
|  | (3.9) | (7.5) | (10.7) | (14.0) | (19.1) | — | — |
| E, MPa | 2 | 4 | 12 | 55 | 187 | 497 | 804 |
|  | (7) | (24) | (48) | (112) | (247) | (434) | (661) |
| Elong., % | 740 | 630 | 300 | 120 | 42 | 24 | 46 |
|  | (260) | (270) | (260) | (190) | (130) | (62) | (21) |
| Ten. Set, % | 39 | 53 | 77 | F | F | F | F |
|  | (8) | (30) | (45) | (72) | F | F | F |
| TSB, MPa | 7 | 10 | 10 | 9 | 16 | 22 | 50 |

TABLE 1-continued

|   | 1 | 2 | 3 | 4 | 5 | 6 | 7 |
|---|---|---|---|---|---|---|---|
|   | (32) | (54) | (66) | (56) | (46) | (35) | (28) |

*curatives, when used

TABLE 2

|   | 1 | 2 | 3 | 4 | 5 | 6 | 7 |
|---|---|---|---|---|---|---|---|
| Nitrile Rubber | 90 | 80 | 70 | 60 | 50 | 40 | 30 |
| Cellulose Acetate Propionate | 10 | 20 | 30 | 40 | 50 | 60 | 70 |
| HVA-2* | 2.25 | 4.0 | 3.5 | 3.0 | 2.5 | 2.0 | 1.5 |
| MBTS* | 0.45 | 0.8 | 0.7 | 0.6 | 0.5 | 0.4 | 0.3 |
| Properties |  |  |  |  |  |  |  |
| UTS, MPa | 0.9 | 1.4 | 2.6 | 4.2 | 11.2 | 17.5 | 33.9 |
|   | (4.2) | (7.5) | (11.9) | (13.0) | (14.3) | (25.5) | (32.3) |
| $M_{100}$, MPa | 1.0 | 1.5 | 2.7 | 2.7 | — | — | — |
|   | (2.4) | (5.6) | (10.2) | — | — | — | — |
| E, MPa | 2 | 4 | 12 | 55 | 187 | 497 | 804 |
|   | (3) | (12) | (36) | (119) | (271) | (485) | (819) |
| Elong., % | 740 | 630 | 300 | 120 | 42 | 24 | 46 |
|   | (240) | (190) | (160) | (100) | (39) | (46) | (43) |
| Ten. Set, % | 39 | 53 | 77 | F | F | F | F |
|   | (15) | (34) | (52) | F | F | F | F |
| TSB, MPa | 7 | 10 | 10 | 9 | 16 | 22 | 50 |
|   | (14) | (22) | (31) | (26) | (20) | (37) | (46) |

*Curatives, when used

The effect of the proportions of nitrile rubber and cellulose ester and the effects of cross-linking the nitrile rubber are shown in Tables 1 and 2. All compositions are processable as thermoplastics. The cellulose ester is cellulose acetate propionate obtained from Eastman Kodak under the tradename Tenite propionate 306E. The nitrile rubber is a polymer containing about 41 weight percent of acrylonitrile obtained from B. F. Goodrich Co. under the tradename Hycar 1031. The rubber curative of Table 1 is zinc stearate and brominated dimethylol p-octylphenol curing resin obtained under the tradename SP-1056. The rubber curative of Table 2 is 2,2'-dithiobis-benzothiazole (MBTS) and m-phenylene bismaleimide (HVA-2). The data show the cross-linking the rubber results in increased tensile strength, ultimate elongation and true stress at break (TSB) in compositions comprising 40 to 90 parts by weight of nitrile rubber. The data also show that compositions comprising 70 to 90 parts by weight of nitrile rubber are elastomeric with tension set values of about 50 or less.

Compositions of the invention containing different nitrile rubbers are illustrated in Table 3. All compositions contain 60 parts by weight of nitrile rubber, 40 parts by weight of cellulose acetate propionate, 6 parts by weight of dimethylol-p-octylphenol curing resin (SP-1045) and 0.3 parts by weight of stannous chloride hydrate (cure activator). The compositions are prepared by the same procedure as for the compositions of Tables 1 and 2. The properties of blends in which the nitrile rubber is cross-linked are shown in parentheses. Oil swell data is determined by immersing specimens in ASTM #3 Oil for 70 hrs. at 121° C. Compositions are prepared with different grades of nitrile rubber with acrylonitrile (AN) contents varying from 21 to 45%. The data show that the properties of the blends vary, depending upon the type of nitrile rubber; however, cross-linking the rubber results in substantial increases in tensile strength and true stress at break with all rubbers. The data also show that in order to obtain elastomeric compositions of blends comprising 60/40 proportions of nitrile rubber and cellulose acetate propionate, that the acrylonitrile content of the rubber should be 30% or higher. The data further shows that oil resistance improved with higher acrylonitrile content.

A composition of the invention comprising a blend containing cellulose acetate butyrate is illustrated in Table 4. The composition is prepared by the same procedure as in Tables 1 and 2. The cellulose ester is cellulose acetate butyrate obtained from Eastman Kodak under the tradename Tenite Butyrate 203E. The nitrile rubber is a polymer containing about 43 weight percent of acrylonitrile obtained from B. F. Goodrich Co. under the tradename Hycar 1000×88. The rubber curative is HVA-2 and organic peroxide (Lupersol 101). Stock 1 is a control without curative. The data indicate that blends comprising cellulose acetate butyrate exhibit properties comparable to blends comprising cellulose acetate propionate.

TABLE 3

| | NITRILE RUBBER 60/CELLULOSE PROPIONATE 40 | | | | | | | | |
|---|---|---|---|---|---|---|---|---|---|
|   | 1 | 2 | 3 | 4 | 5 | 6 | 7 | 8 | 9 |
| Nitrile Rubber, AN Content, % | 21 | 22 | 29 | 33 | 33 | 39 | 41 | 43 | 45 |
| Properties |  |  |  |  |  |  |  |  |  |
| UTS, MPa | 6.8 | 1.5 | 3.9 | 1.7 | 7.6 | 3.7 | 7.6 | 8.0 | 4.0 |
|   | (12.1) | (2.5) | (12.9) | (13.2) | (15.1) | (19.0) | (17.8) | (21.1) | (16.5) |
| $M_{100}$, MPa | — | — | — | — | 7.6 | 4.9 | 7.2 | — | 4.7 |
|   | (11.6) | (—) | (12.3) | (10.7) | (13.3) | (14.0) | (13.6) | (16.6) | (13.3) |
| E, MPa | 40 | 16 | 34 | 17 | 51 | 34 | 46 | 77 | 27 |
|   | (58) | (41) | (49) | (46) | (70) | (85) | (95) | (135) | (68) |
| Elong., % | 84 | 110 | 100 | 84 | 130 | 240 | 200 | 100 | 470 |

TABLE 3-continued

| NITRILE RUBBER 60/CELLULOSE PROPIONATE 40 | | | | | | | | | |
|---|---|---|---|---|---|---|---|---|---|
| | 1 | 2 | 3 | 4 | 5 | 6 | 7 | 8 | 9 |
| Ten. Set, % | (100) F (F) | (23) F (F) | (110) 48 (F) | (140) F (38) | (120) F (40) | (150) 82 (52) | (140) 70 (50) | (150) F (77) | (140) 81 (55) |
| TSB, MPa | 12 (24) | 3 (3) | 8 (27) | 3 (32) | 17 (33) | 13 (48) | 23 (43) | 16 (53) | 23 (40) |
| Oil Swell, % | 38 (25) | 40 (23) | 26 (17) | 10 (10) | 8 (8) | 3 (3) | 2 (2) | 0 0 | 0 (1) |

TABLE 4

| Sample No. | 1 | 2 |
|---|---|---|
| Nitrile Rubber | 60 | 60 |
| Cellulose Acetate Butyrate | 40 | 40 |
| HVA-2 | — | 2.4 |
| Peroxide | — | 0.15 |
| Properties | | |
| UTS, MPa | 11.7 | 20.0 |
| $M_{100}$, MPa | 8.9 | 13.4 |
| E, MPa | 38 | 74 |
| Elong., % | 200 | 160 |
| Ten. Set, % | 50 | 50 |
| TSB, MPa | 36 | 52 |

To illustrate a static cured composition, sulfur curatives are mixed on a mill at 60° C. with a blend of 30 parts by weight cellulose acetate propionate and 70 parts by weight of nitrile rubber (Hycar 1091-50). The composition is vulcanized in a press at 160° C. for 30 minutes. The vulcanizate properties are tensile strength 19.6 MPa, 100% modulus 10.8 MPa, ultimate elongation 280%, true stress at break 75 MPa, and tension set 15%.

Although the invention has been illustrated by typical examples, it is not limited thereto. Changes and modifications of the examples of the invention chosen for purposes of disclosure can be made which do not constitute departure from the spirit and scope of the invention.

The embodiments of the invention in which an exclusive property or privilege is claimed are defined as follows:

1. A composition comprising a blend of about 5-65 parts by weight of cellulose ester selected from the group consisting of cellulose propionate, cellulose butyrate, cellulose acetate propionate and cellulose acetate butyrate, and correspondingly, about 95-35 parts by weight of cured nitrile rubber in which the rubber is cured to the extent that no more than 25 weight percent of the rubber is extractable in a solvent in which uncured nitrile rubber is essentially completely soluble.

2. The composition of claim 1 in which the nitrile rubber comprises about 30-55 weight percent of acrylonitrile.

3. The composition of claim 2 which comprises about 10-40 parts by weight of cellulose ester and correspondingly, about 90-60 parts by weight of nitrile rubber.

4. The composition of claim 3 in which the cured rubber is in the form of discrete dispersed particles and which composition is elastomeric and processable as a thermoplastic.

5. The composition of claim 4 in which the rubber is cured to the extent that no more than 10 weight percent of the rubber is extractable in a solvent in which uncured nitrile rubber is essentially completely soluble.

6. The composition of claim 5 in which the cellulose ester has a flow temperature of about 125° to 200° C.

7. The composition of claim 6 in which the cellulose ester is cellulose acetate butyrate.

8. An elastoplastic composition comprising a blend of cellulose ester selected from the group consisting of cellulose propionate, cellulose butyrate, cellulose acetate propionate, and cellulose acetate butyrate, in an amount sufficient to impart thermoplasticity to the composition, and cured nitrile rubber in the form of dispersed particles of a size small enough to maintain thermoplasticity of the composition and which rubber is present in an amount sufficient to impart rubberlike elasticity to the composition in which the rubber is cured to the extent that no more than 25 weight percent of the rubber is extractable in a solvent in which uncured nitrile rubber is essentially completely soluble.

9. The composition of claim 8 comprising about 5-35 parts by weight of cellulose ester and correspondingly, about 95-65 parts by weight of nitrile rubber comprising about 30-55 weight percent of acrylonitrile.

10. The composition of claim 9 in which the cured rubber particles are of a size of about 50 microns number average or less.

11. The composition of claim 10 in which the cured rubber particle size is about 0.1-10 microns number average.

12. The composition of claim 11 in which the rubber is cured to the extent that the cross-link density of the rubber is about $3 \times 10^{-5}$ to $3 \times 10^{-4}$ moles per milliliter of rubber.

13. The composition of claim 12 in which the cellulose ester has a flow temperature of about 125°-200° C.

14. The composition of claim 13 in which the cellulose ester is cellulose acetate butyrate.

15. The composition of claim 13 in which the cellulose ester is cellulose acetate propionate.

* * * * *

UNITED STATES PATENT AND TRADEMARK OFFICE
CERTIFICATE OF CORRECTION

PATENT NO. : 4,358,553

DATED : November 9, 1982

INVENTOR(S) : A. Y. Coran et al

It is certified that error appears in the above-identified patent and that said Letters Patent are hereby corrected as shown below:

Column 3, line 29: "$3 \times 10^{-3}$" should read as follows: --$3 \times 10^{-5}$--.

Signed and Sealed this

Eleventh Day of January 1983

[SEAL]

Attest:

Attesting Officer

GERALD J. MOSSINGHOFF

Commissioner of Patents and Trademarks